Aug. 24, 1943.  C. F. SALTZ  2,327,606
BALANCING ROTATING ELEMENT
Filed March 5, 1941  3 Sheets-Sheet 1
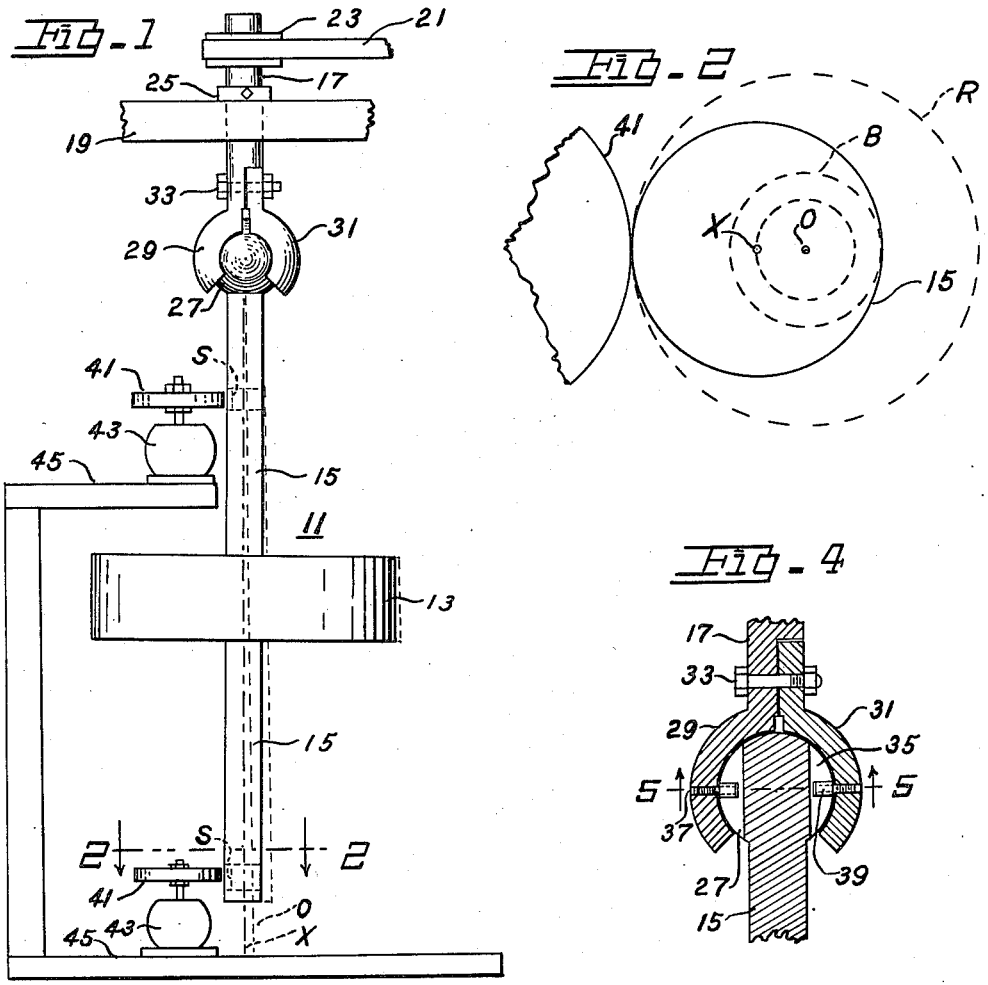
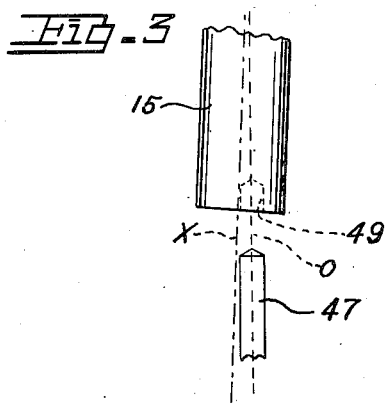
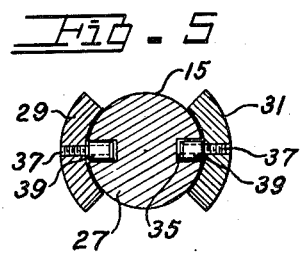
INVENTOR.
Clare F. Saltz
BY
HIS ATTORNEY Aug. 24, 1943.     C. F. SALTZ     2,327,606
BALANCING ROTATING ELEMENT
Filed March 5, 1941     3 Sheets-Sheet 2
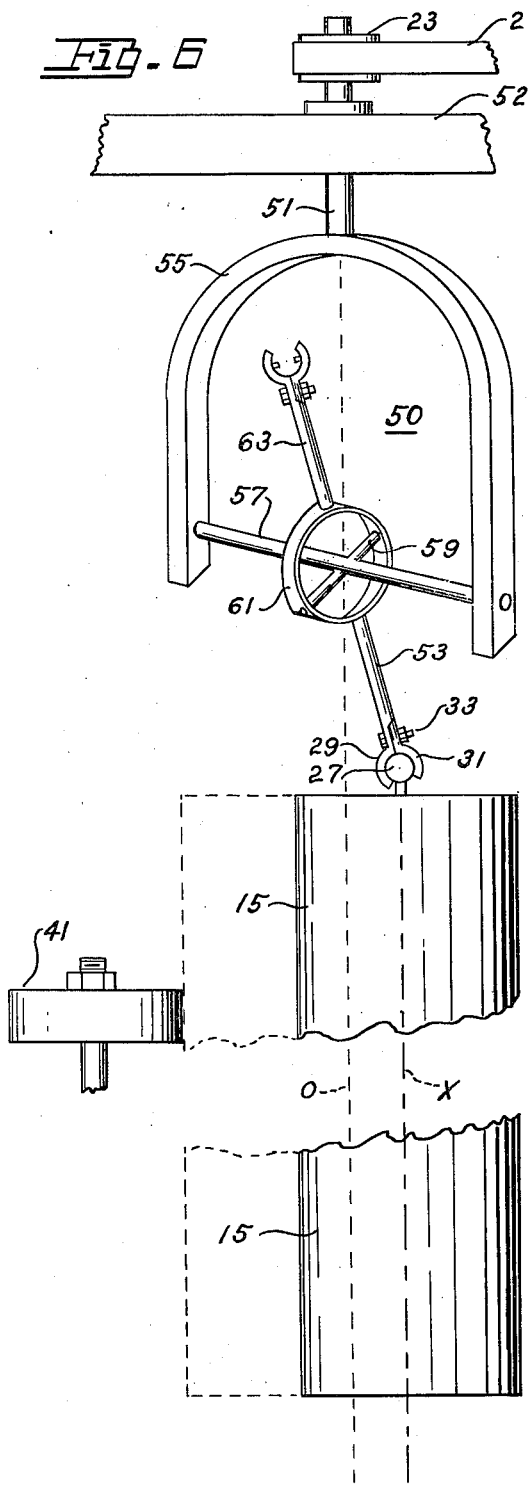
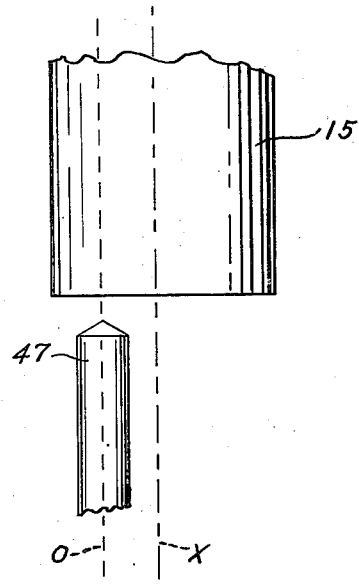
INVENTOR.
Clare F. Saltz
BY J.J.Hicks
HIS ATTORNEY Aug. 24, 1943. C. F. SALTZ 2,327,606
BALANCING ROTATING ELEMENT
Filed March 5, 1941 3 Sheets-Sheet 3

INVENTOR.
Clare F. Saltz
BY J. D. Hicks
HIS ATTORNEY

Patented Aug. 24, 1943

2,327,606

UNITED STATES PATENT OFFICE 2,327,606

BALANCING ROTATING ELEMENT

Clare F. Saltz, Ypsilanti, Mich.

Application March 5, 1941, Serial No. 381,849

7 Claims. (Cl. 51—289)

My invention pertains to an improved method of and means for preparing rotating elements of metal or other material for balanced rotation.

In the production of rotatable machine parts such as flywheels, crank shafts, and the like, it is very important to provide a uniform distribution of the mass around the axis of rotation in order to obtain a nearly perfect balance in the rotating element. This is especially important in the production of parts to be rotated at high speeds. As is well known, unbalanced machine parts rotating at high speed in fixed bearings absorb a large amount of energy and also cause wear and vibration. Also, when the unbalance is considerable, it is sometimes necessary to change the operating speed to some other speed less suitable for the operation desired. Such unbalance exists when the center of gravity of the rotating part does not coincide with the axis of rotation. But the careful balancing of such parts requires the expenditure of considerable skill and time and adds greatly to the cost of production of such elements.

It has been customary to carefully test the element to determine on which side of the axis it is overbalanced and the magnitude thereof. An attempt is then generally made to remove or to add sufficient metal at a proper location on the element to balance it by a cut and try method successively testing the part and removing metal therefrom. I am also aware that various arrangements have been previously provided for automatically removing metal from such an element to balance it in an attempt to simplify this difficult and costly operation.

In accordance with my invention, metal is not removed from the element for the purpose of balancing but instead the element is prepared for balanced rotation by forming bearing surfaces so located on the element that when the element is mounted to rotate thereon it is balanced to the desired degree of perfection. It is accordingly an object of my invention to provide an improved method of and means for balancing rotating elements in this manner.

It is also an object of my invention to provide an improved method of and means for balancing a rotating element by universally mounting the element to be balanced, rotating the element at a speed sufficient to cause it to select its axis of rotation and describe a surface of revolution, and then forming bearing surfaces on the portions of the element which are to be journalled by removing metal therefrom at the points of coincidence of the actual surface of the element with the surface of revolution so that bearing surfaces are formed concentric with the self selected axis of rotation of the rotating element.

It is a further object of my invention to provide for in this manner preparing elements for balanced rotation either journalled in bearings plain or thrust, or on pivot shafts or pins.

Another object of my invention is to provide an improved apparatus for so balancing rotating elements comprising a counter-balanced double universal joint arrangement.

Also it is a further object of my invention to provide improved apparatus for balancing rotating elements, in accordance with my improved method, comprising bearing means for rotatively supporting the lower portion of the element while applying driving torque to keep it spinning.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of my invention, similar reference characters being applied to corresponding elements throughout, and in which:

Fig. 1 is a side elevational view showing one embodiment of apparatus arranged for preparing an element for balanced rotation in accordance with my invention;

Fig. 2 is an enlarged cross sectional view on line 2—2 of Fig. 1, and partially diagrammatic, for illustrating the operation of forming new self selected bearing surfaces on the periphery of the element;

Fig. 3 is an enlarged fragmentary side elevational view showing how an internal bearing aperture may be formed and located in the end of a shaft to pivotally journal the element for balanced rotation;

Figs. 4 and 5 are enlarged detail sectional views showing the construction of the ball and socket of the universal support which is arranged to provide a positive driving connection to the element;

Fig. 6 is a side elevational view, partially broken away, showing a different or counter-balanced double universal joint embodiment of my balancing apparatus arranged for balancing an element;

Fig. 7 is an enlarged fragmentary view showing how the counter-balanced double universal joint arrangement, of Fig. 6, may be utilized for locating and forming an internal bearing aperture to prepare an element for balanced rotation on a pivot pin or shaft;

Figure 8:
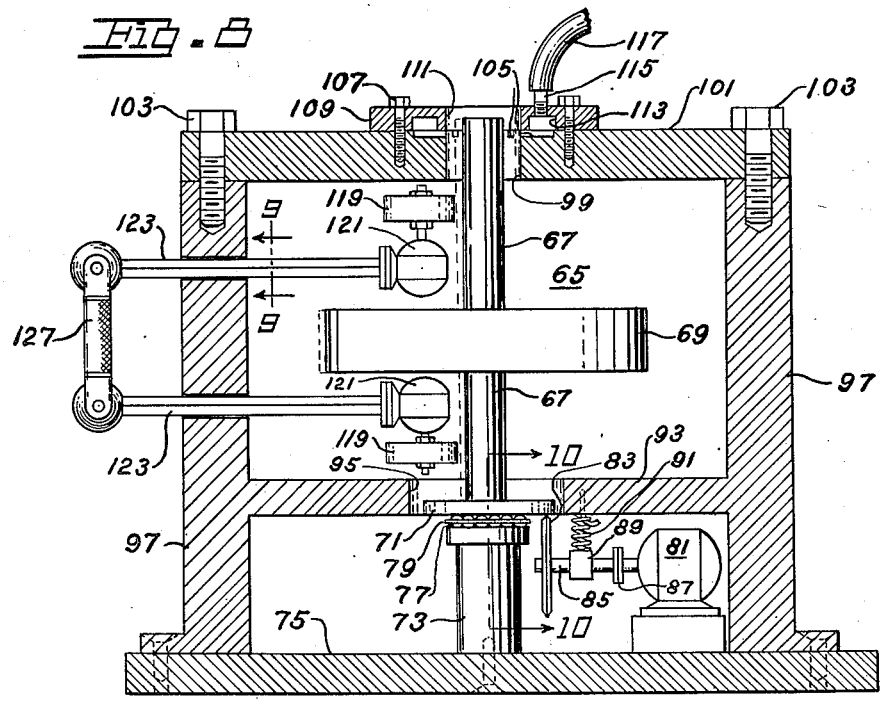
Fig. 8 is a side elevational view, partially sectioned, for showing another embodiment of my apparatus for preparing a rotating element for balanced rotation.

Referring more specifically to Fig. 1 of the drawings I have illustratively disclosed an embodiment of my apparatus arranged for preparing for balanced rotation a work piece or element 11 consisting, for example, of a fly wheel 13 and a shaft 15 which is to be journalled in fixed bearings for supporting the fly wheel, although other machine parts may be balanced in accordance with my invention. The upper end of the shaft 15 is supported for free tilting movement from the lower end of a driving shaft 17 which is supported by and journalled in a rigid structural member or bracket 19. Power for driving the drive shaft may be applied from any suitable source, as by a belt 21 running over a pulley 23 secured on the upper end of the drive shaft, or a directly connected electric motor or other power source may be utilized, as will be understood. A collar 25 may be secured on the shaft to limit axial movement in the bearing in a well known manner.

The upper end of the shaft 15 is mounted by means of a ball 27 thereon, which is quickly and conveniently inserted between a pair of clamping jaws 29 and 31 conformed to fit snugly over and around the sphere. One of the clamp jaws 29 is rigid or integral with the lower end of the drive shaft 17, and the other jaw 31 is separate and relatively movable, being clamped thereto by a clamping bolt 33 passed through the shanks of the two jaws. The sphere 27 may be integral with the shaft 15 or it may be a separate member threadably secured therein. After the sphere 27 has been inserted into the universal mounting jaws 29 and 31, these are clamped together onto the sphere by tightening up the nut on the clamping bolt 33, just sufficiently to hold it between the two jaws to rotate the element or work piece while permitting it to swing for universal movement therein.

In Figs. 4 and 5 I have shown the structural details of the universal ball and socket joint for positive driving. This is arranged by providing slots 35 cut into diametrically opposite sides of the sphere 27 substantially parallel with the geometric axis of the shaft 15. Each of the jaws 29 and 31 of the universal support is provided with an inwardly projecting pin 37 which may be threaded into the jaw. The pins 37 are substantially in alignment on a diameter of the sphere and the clamping jaws. As the sphere of the element to be balanced is secured into the jaws, the pins 37 are inserted into the oppositely disposed slots 35. Friction reducing roller sleeves 39 are preferably provided on the pins. As the power is applied to the drive shaft 17, the pins in the slots apply power positively to the ball 27 on the end of the shaft 15 and the element or work piece is thus quickly brought up to speed without slippage. Also the jaws may be clamped very loosely about the sphere permitting free movement. In operation the force of a cutting tool on the element can not cause it to slip in my positive driving universal support because of the pins projecting from the jaws into the slots and when the operation is completed, the element may be more quickly stopped and removed so that a new element may be inserted and production speeded up.

After mounting the element or work piece for universal movement, power is applied to rotate the drive shaft 17 and the universal ball support causes the shaft 15 and the fly wheel 13 of the element being balanced to come up to speed.

All masses under rotation seek to revolve upon an axis passing through the center of gravity of the element, but with an unbalanced member rotating on fixed bearings this condition is not attainable so that the state of unbalance continues causing vibration, power loss and wear. In accordance with my invention the element 11 being prepared for balanced rotation is universally mounted and it is free to shift and select its own axis of rotation, which it does, and the element then rotates on an axis passing through the center of gravity. This self selected axis of rotation, which is termed the centroidal axis, is represented in Fig. 1 by a dotted line designated "o." The original or geometric axis of the shaft is represented by a dot dash line designated "x." Also in the cross sectional view Fig. 2, the same reference characters o and x have been applied for representing the location of these two axes, and in both Figs. 1 and 2 the displacement of these two axes has been substantially exaggerated for clearance of illustration.

When the work piece or element 11 is mounted and rotated, as shown in Fig. 1, it rotates on its self selected axis, and describes a surface of revolution, shown as a dotted circle R in Fig. 2. In accordance with my invention the rotating element is then approached with any suitable metal removing means, such as a tool or grinding wheel 41, which engages the portion of the shaft 15 which is to be journalled in fixed bearings. The grinding wheels 41 may be supported upon and driven by the extended vertical shafts of suitable electric motors 43. These motorized grinders are preferably supported upon horizontal supporting and guiding members 45 whereupon these may be slidably moved to engage the shaft 15. The metal removing means 41 engages the peripheral surface of the shaft 15 once in each revolution of the shaft removing metal from the surface thereof at the point of coincidence with the surface of revolution R, as may be seen more clearly in Fig. 2. As this operation is continued, a new bearing surface S, shown by dotted lines in Fig. 1, is formed on the periphery of the shaft which, when completed, is so located as to be concentric with the self selected axis of rotation 0. This bearing surface may be cylindrical, conical or any other conformation having a circular cross-section.

In the final stages of the operation, the metal removing means 41 engages the outer surface of the element shaft smoothly and continuously during its entire rotation. The operation is performed with only a light engaging force between the rotating element and the metal removing means and gyroscopic action tends to hold the element steady on its self selected axis of rotation 0 when it is engaged by the metal removing means.

The operation of forming bearing surfaces on the shaft, concentric with the self selected axis of rotation 0, is performed simultaneously on each portion of the shaft to be journalled in fixed bearings. If the different bearing surfaces were formed successively, the removal of metal to form the second formed surfaces would shift the centroidal axis 0 sufficiently to throw the first formed bearing surfaces out of alignment. If desired the sphere 27 may then be removed from the end of the shaft 15, which does not unbalance the element. The element 11 is then finished ready to be mounted for balanced rotation.

As shown in Fig. 3, the principle of my invention may also be conveniently utilized in preparing any element for balanced rotation on pivot pins or shafts aligned axially with axis 0 of the element. This is readily accomplished in accordance with my invention, by approaching the end of the shaft 15 of the element or work piece with any suitable drill or boring tool 47 aligned on the self selected axis 0 of the shaft for forming an aperture 49 in the end of the shaft to receive the end of any pivot shaft or pin which may be inserted therein for journaling the element.

In this manner bearing surfaces are formed on or in the shaft 15 concentric with the self selected axis 0 of rotation of the shaft, and the element is prepared for balanced rotation without the necessity of removing metal from the body of the element to attempt to balance it to rotate on its original or geometric axis.

In Fig. 6 I have shown another embodiment of apparatus for performing my improved method comprising a universal joint on the lower end of a drive shaft 51, an intermediate bar 53 projecting down therefrom and a second universal joint on the lower end of the intermediate bar where it holds the sphere provided on the upper end of the element being prpared for balanced rotation. The drive shaft 51 passes through and is journalled in any suitable structural member 52 wherein it may be driven by any suitable power source as in the first embodiment. The universal joint on the lower end of the drive shaft 51 comprises a U-shaped bracket 55 with the yoke secured to the lower end of the drive shaft and the legs thereof projecting downwardly. Journalled in and extending between the ends of the legs of the bracket 55 is a shaft 57 having a pair of cross arms 59 projecting in opposite directions from the center. A ring 61 is pivoted on the outer ends of the cross arms 59 and the intermediate bar 53 projects from the lower side of the ring, to which it is secured in any suitable manner, as by welding for example. The second universal joint, which is on the lower end of the intermediate bar, may comprise a pair of jaws 29 and 31 clamped together by a bolt 33 and conformed to snugly clasp a sphere 27 extending from the geometrical axis of the shaft 15 of an element being balanced, as in the first modification previously described. The universal clamps preferably utilize the positive driving arrangement as previously described in connection with the first embodiment.

In operation, the intermediate bar 53 takes a slanting position, as shown, such that the geometrical axis of the element is deflected from and spaced from the axis of rotation 0 sufficiently so that balanced rotation of the element is obtained. This may be a parallel or an angular deflection depending upon the distribution of the mass in the rotating element. This deflection will be in accordance with the amount of unbalanced mass in the element. In this system of rotating bodies the mass of the intermediate bar 53 becomes a part of the unbalanced mass because it is inclined with reference to the vertical and describes a cone. To counterbalance for the effect of the intermediate bar I provide a counter balancing bar 63 extending from the opposite side of the ring 61 to which it may be secured in any suitable manner, as by welding. I have shown an identical structure for this purpose, although any suitable member may be utilized, whereby the distribution of the masses on opposite sides of the ring 61 is so arranged that the rotating structure comprising the two universal joints and the intermediate bar 53 is dynamically balanced.

By this arrangement the unbalancing effect of the mass of the intermediate bar 53 is counterbalanced, but a centrifugal effect is set up by the two bars 53 and 63 such that the oppositely disposed masses tend to fly out from the axis of rotation similarly to a fly ball governor which movement is opposed by the weight of the work element 15 hanging from the lower clamp. For proper balancing, it is important to operate the apparatus at a proper speed in accordance with the weight of the work element being balanced, and for this reason each element is weighed before being mounted in the universal clamp. The speed of rotation per minute at which balancing can be done perfectly is then found from the equation:

$$\text{RPM} = K\sqrt{\frac{M_2}{M_1}}$$

and $M_1$ is the mass of the two oppositely disposed members, $M_2$ is the mass of the work element being balanced, and $K$ is a constant depending upon the geometrical shape of the rotating structure.

The element 15 having been weighed and mounted in the bottom universal clamp of the apparatus, is then spun at the proper speed. The work element then selects its own axis of rotation 0 about which balanced rotation is obtained and which axis is displaced from the geometric axis X, as shown, although this has been greatly exaggerated for clearness. In actual practise this displacement would be a very small fraction of the diameter of the shaft 15. While the shaft 15 of the work element is rotating in this manner it has an eccentric throw and describes a surface of revolution. As shown in Fig. 6, the work element 15 is at the extreme right position and the vertical dotted line on the left hand side represents the extreme position of movement of the element to the left, as it rotates to generate a surface of revolution, the axis of rotation being displaced from the geometrical axis a distance as shown. As the element rotates, it is engaged by metal removing means, such as a grinding wheel 41, on the portions where bearing surfaces to be formed in the manner described with reference to the first embodiment. In this manner metal is removed to form bearing surfaces concentric with the self selected axis of rotation 0, and the work element is completed to be journalled for balanced rotation.

If there are several portions of the shaft 15 of the work element to be journalled, the bearing surfaces should be formed simultaneously at all these points, as in the first embodiment, to avoid throwing the first formed bearing surface out of balance when metal is removed to form the second bearing surface on the shaft.

The apparatus shown in Fig. 6, may also be utilized for preparing the element 15 for balanced rotation on pivot pins or shafts aligned axially with the O axis of the work piece or element. For this purpose, the end of the shaft 15, while rotating, is approached by any suitable drill 47 aligned on the O axis, and an aperture is formed in the end of the shaft having bearing surfaces concentric with this self selected axis of rotation.

Figure 9:
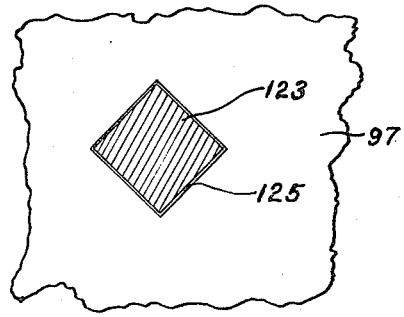
Fig. 9 is an enlarged fragmentary sectional view taken on line 9—9 in Fig. 8, showing how the brackets of the motorized grinders are slidably mounted.
Figure 10:
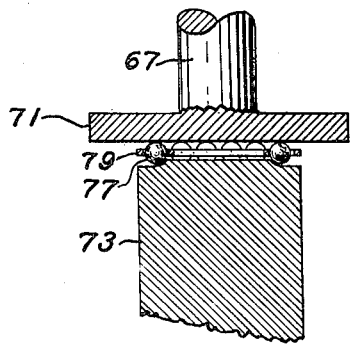
Fig. 10 is an enlarged fragmentary sectional view on line 10—10 of Fig. 8, showing the free bearing support.

In Figs. 8, 9 and 10, I have shown a different embodiment of the apparatus arranged for preparing a rotating element 65 for balanced rotation in accordance with my invention. As shown, the element 65 to be balanced may consist of a shaft 67 having a flywheel 69 secured thereon and having a flange 71 projecting laterally from the lower end for some such purpose as attachment to a machine, or for limiting the axial movement of the shaft after the element has been journalled in its ultimate installation. Although this particular element is shown by way of example, it is to be understood that the element to be balanced may take various other forms.

The apparatus comprises a bearing standard 73 rising from a base 75 whereon the apparatus is constructed or assembled. The lower end of the element 65 rests and spins freely upon the upper end of the bearing standard 73, which comprises a free bearing support, and friction reducing ball bearings 77 are preferably provided thereon to reduce the friction to a minimum. The friction reducing balls are confined in a ball retainer cage 79, in a well known arrangement, there being several ball bearing assemblies on the market which are suitable for this purpose.

For spinning the element so that it will select a centroidal axis about which balanced rotation will be obtained, any suitable source of power may be utilized, such as an electric motor 81 having suitable speed adjustable characteristics. The motor is mounted on the base 75, and to apply driving torque to the lower end of the vertically disposed element shaft 67, a friction drive wheel 83 is provided. This friction drive wheel 83 is secured on a horizontally disposed shaft 85 which is secured to the extended end of the motor shaft through a flexible coupling 87 which may be of any well known construction. The friction drive wheel 83 is maintained in positive engagement with the flange of the element by means of a floating bearing 89 thereon drawn upwardly by a spring 91 suspended from a structural member 93. The friction drive wheel 83 is preferably provided with a periphery which is either rounded or bevelled to present a minimum localized contact area engaging the lower end of the element.

Th disk-like flange 71 on the lower end of the shaft 67 is enclosed in a guide aperture 95 in the structural member 93, the latter being horizontally supported between a pair of vertical side members 97, which may be either spaced brackets or housing side walls, in a substantially H formation. The guide aperture 95 is of a substantially larger diameter than the circular flange disk 71 and serves to approximately predetermine the position of the lower end of the shaft 67 on the free bearing standard 73 while permitting it to rotate freely to select its own centroidal axis of rotation for balanced rotation.

The upper end of the shaft 67 of the element is also similarly confined within predetermined limits in a guide aperture 99 in a horizontal top bracket 101. The top bracket 101 is secured horizontally across the top of the side members 97 as by screws 103 in the ends of these members. The guide aperture 99 is of a larger diameter than the shaft 67 to permit it to move freely therein.

To prevent direct engagement or striking between the shaft 67 and the side walls of the aperture 99, provision may be made for projecting streams of air or other fluid thereinto from all sides. This may be conveniently provided for by cutting in the top surface of the top bracket 101 a plurality of slots 105 which extend radially opening through the side walls toward the center of the aperture 99. Clamped firmly on top of the top bracket 101 by means of screws 107 is a manifold plate or ring 109 of an annular conformation having a central aperture 111 in alignment with the guide aperture 99. An annular fluid conducting inlet passage 113 in the under side of the manifold plate 109 connects with all the radial slots 105 and supplies air or other fluid thereto from any suitable pressure source, to which it may be connected through a nipple 115 and hose 117 A tight sealed joint may be conveniently provide. between the manifold ring 109 and the top bracket 101 by inserting any suitable gasket material therebetween, as will be understood. When the upper end of the shaft 67 of the spinning element approaches the side wall of the guide aperture 99 in any direction, the cylindrical peripheral surface of the shaft closely approaches the side wall of the aperture tending to confine or restrict the jets of fluid from an adjacent one of the slots 105 and this applies a force gently guiding the shaft away from the side wall of the aperture. If the shape of the work pieces makes it desirable, the lower guide aperture 95 may also be similarly arranged, although the fluid jets may preferably be omitted when the lower end of the motor driven work piece has a flange 71, as shown.

As the unbalanced element spins, it rotates on its self selected centroidal axis about which balanced rotation is obtained, and it describes a surface of revolution larger in diameter than the shaft, in accordance with the amount of unbalanced mass in the element. In Fig. 8, the element is shown in full lines in its extreme right hand position and a dotted line represents its extreme left hand position. New bearing surfaces are cut simultaneously upon all portions of the shaft which are to be journalled. This is accomplished by approaching the shaft 67 with any suitable metal removing devices, such as rotating grinding wheels 119 supported and driven by electric motors 121 mounted on the ends of bars 123 which slide through apertures 125 in the side member 97.

The sliding motor supporting bars 123 and the apertures 125 are of a square, or other non-circular cross section, as shown in Fig. 9, so that the shafts of the motors are maintained disposed in suitable vertical or predetermined positions while being moved toward or away from the rotating element. A handle 127 may be provided connected to the two slidable brackets 123 for conveniently moving both of the grinding wheels 119 against the work. As the grinding wheels 119 are at first moved into engagement with the shaft 67, a brief contact is established once during each revolution. In operation the fluid jets softly guide the upper end of the rotating shaft 67 to resist deflection movements of translation while the gyroscopic action of the work piece caused by rotation resists angular or tilting deflections. As the metal is cut away to form the new bearing surfaces, the period of contact between the grinding wheels and the shaft becomes longer until finally a smooth but light contact is maintained during the entire rotation. This informs the operator that the operation is completed and that new bearing surfaces have been cut which are concentric with the centroidal axis. Bearing surfaces of any desired length may be cut by selecting grinding wheels 119 of a corresponding axial dimension. Work elements may be balanced in accordance with the principles of my invention whether these are made of metal, plastic compositions or other materials. The modification shown in Figs. 6 and 7 is claimed in my copending patent application Serial No. 430,008; and that of Figs. 8, 9 and 10 is claimed in my copending application Serial No. 430,009. Both of these applications were filed on February 9, 1942.

It is apparent that within the scope of the invention, modifications and different arrangements may be made other than herein disclosed, and the present disclosure is illustrative merely, the invention comprehending variations thereof.

I claim:

1. The method of preparing an element for balanced rotation which consists in, mounting the element to be balanced for rotation and free tilting movement toward or away from the axis of rotation, rotating the element at a speed sufficient to cause it to select its axis of rotation and describe a surface of revolution, and forming bearing surfaces on portions of the element to be journalled by simultaneously removing metal therefrom at the points of coincidence of the actual surface of the element with said surface of revolution so that the bearing surfaces are formed concentric with the axis of rotation of the element.

2. The method of preparing an element having a shaft portion for balanced rotation which consists in, mounting the element for free tiltable movement and rotation substantially on the geometrical axis of its shaft portion, rotating the element at a speed sufficient to cause it to select its axis of balanced rotation while also causing said shaft portion to describe a surface of revolution, and forming bearing surfaces self selected on said shaft portion concentric with the self selected axis of rotation by removing metal simultaneously therefrom at the points of coincidence of the actual surface of the shaft portion with said surface of revolution.

3. Apparatus for preparing a rotating element for balanced rotation comprising, a shaft journalled for rotation on a substantially vertical axis, a work support on the lower end of said shaft for the free tilting support and rotation of an element for balancing, and movable metal removing means adjacently disposed for removing metal from an element to form bearing surfaces concentric with the self selected axis of rotation as the element rotates.

4. In combination in balancing apparatus for preparing a rotating work piece for balanced rotation, a shaft journalled for rotation on a substantially vertical axis, means on the lower end of said shaft for the free tiltable support of a work piece and for rotating the work piece on a substantially vertical axis, metal removing means, and means for supporting said metal removing means for horizontal movement toward or away from a work piece so supported and rotated to form bearing surfaces on the work piece as it rotates so that such bearing surfaces may be formed concentric with the self selected axis of rotation of the work piece.

5. In combination in balancing apparatus for preparing a rotating work piece for balanced rotation, a shaft journalled for rotation on a substantially vertical axis, clamping jaws on the lower end of said shaft for the free tiltable support of a work piece and for rotation on a substantially vertical axis, a metal removing wheel, and means for supporting said metal removing wheel for adjustable horizontal movement toward or away from a work piece so supported and rotated to form a bearing surface on the work piece as it rotates so that such bearing surface may be formed concentric with the self selected axis of rotation of the work piece.

6. Balancing apparatus having the combination according to claim 5, and further characterized by having said clamping jaws shaped to clasp a sphere on the work piece, and said jaws having inwardly extending projections for insertion into recesses in the sphere for positive driving engagement therebetween.

7. Balancing apparatus according to claim 5 and having in combination a second metal removing wheel, and means for supporting said second metal removing wheel for adjustable horizontal movement toward the work piece at a different horizontal level for forming a bearing surface on the work piece spaced from the bearing surface formed by the first mentioned metal removing wheel.

CLARE F. SALTZ.